United States Patent [19]

Hoenig et al.

[11] Patent Number: 4,594,382

[45] Date of Patent: Jun. 10, 1986

[54] THERMALLY STABILIZED CARBOXYL-CONTAINING ETHYLENE COPOLYMERS AND PREPARATION THEREOF

[75] Inventors: Stephen M. Hoenig, Angleton; David P. Flores, Lake Jackson; Gregory S. O'Connell, Angleton, all of Tex.

[73] Assignee: The Dow Chemical Company, Midland, Mich.

[21] Appl. No.: 672,004

[22] Filed: Nov. 16, 1984

[51] Int. Cl.$^4$ .............................................. C08K 5/09
[52] U.S. Cl. ..................... 524/400; 524/394; 524/395; 524/397; 524/398; 524/399; 524/405
[58] Field of Search ............... 524/398, 399, 400, 405, 524/394, 395, 397

[56] References Cited

U.S. PATENT DOCUMENTS

| | | | |
|---|---|---|---|
| Re. 30,193 | 1/1980 | O'Shaughnessy | 260/45.7 R |
| 3,520,861 | 7/1970 | Thompson | 260/88.1 |
| 3,912,671 | 10/1975 | Kondo | 260/42.13 |
| 3,953,565 | 4/1976 | Mizutani | 264/210 F |
| 3,959,539 | 5/1976 | Waggoner | 524/397 |
| 3,969,434 | 7/1976 | Powell | 524/400 |
| 3,974,114 | 8/1976 | Sowa | 524/394 |
| 4,021,380 | 5/1977 | Nuttall | 260/2.5 HA |
| 4,085,088 | 4/1978 | Miyata | 260/45.7 R |
| 4,098,762 | 7/1978 | Miyata | 260/45.7 R |
| 4,353,817 | 10/1982 | Nakae | 524/398 |
| 4,373,039 | 2/1983 | Mueller | 523/205 |
| 4,379,882 | 4/1983 | Miyata | 524/436 |
| 4,421,876 | 12/1983 | Greber | 523/402 |
| 4,430,470 | 2/1984 | Taniguchi | 524/269 |

OTHER PUBLICATIONS

The Condensed Chemical Dictionary, Tenth Ed. (Van Nostrand Reinhold Company 1981), pp. 39–44, 105–110, 174–176, 178–187, 622–625, 632–637, 844–855, 931–955, and 1106–1113.
CRC Handbook of Chemistry and Physics, 56th Ed., p. B-82.
Lange's Handbook of Chemistry, 12th Ed., pp. 4–35.

*Primary Examiner*—Paul R. Michl
*Attorney, Agent, or Firm*—W. J. Lee

[57] ABSTRACT

A carboxyl-containing ethylene copolymer composition exhibiting thermal stability and method for preparing the same. The composition comprises (a) an ethylene copolymer containing a carboxyl-functional comonomer in an amount ranging from about 0.01 to about 50 weight percent of the copolymer, and (b) a hydrated compound in intimate admixture therewith. The hydrate dehydrates at a temperature between about 100° C. and about 300° C. and is selected from hydrated metallic salts of organic acids, inorganic hydrates, bimetallic hydrates and combinations thereof. The hydrate is present in the composition in at least an amount effective to impart thermal stability thereto up to about 5 weight percent of the composition, preferably 0.01–0.45 weight percent. The composition is prepared by adding the hydrate to the copolymer and intimately mixing the hydrate and the copolymer. The addition and mixing steps are performed either during or subsequent to the manufacture of the copolymer.

40 Claims, No Drawings

THERMALLY STABILIZED CARBOXYL-CONTAINING ETHYLENE COPOLYMERS AND PREPARATION THEREOF

FIELD OF THE INVENTION

This invention relates to thermally stabilized carboxyl-containing ethylene copolymers and a method of preparing the same. More particularly, this invention relates to the stabilization of carboxyl-containing ethylene copolymers with hydrated compounds.

BACKGROUND OF THE INVENTION

Ethylene copolymers containing carboxyl groups, such as those described in U.S. Pat. No. 3,520,861, are well known. However, ethylene copolymers containing pendant carboxyl groups are inherently susceptible to thermal instability. In the production of such ethylene copolymers, this inherent instability poses a significant problem because of crosslinking of the polymer, variation in melt flow values, and the formation of crosslinking by-products which are corrosive to process equipment. In addition, the instability seriously limits the useful life of products made from these ethylene copolymers, including films, coatings, adhesives, and the like.

Thermal stabilizing additives heretofore employed in conjunction with carboxyl-containing ethylene copolymers have not provided satisfactory results. Likewise, the injection of steam into molten ethylene copolymers containing carboxyl groups has not provided satisfactory results and, in addition, has the further disadvantages of adversely affecting the quality of products made from the copolymers and corroding processing equipment.

SUMMARY OF THE INVENTION

The invention is a carboxyl-containing ethylene copolymer composition exhibiting improved thermal stability and a method of preparing the composition. Briefly, the composition is a carboxyl-functional ethylene copolymer and a hydrated compound in intimate admixture therewith. The copolymer comprises ethylene and from about 0.01 to about 50 percent by weight of the copolymer of a carboxyl-functional comonomer polymerized therewith. The hydrate dehydrates at a temperature between about 100° C. and about 300° C., preferably about 160°-275° C. The hydrate is present in the composition in at least an amount effective to impart thermal stability thereto up to about 5 weight percent of the composition, preferably 0.01-0.45 weight percent, most preferably 0.01-0.15 weight percent.

The method of the invention includes adding a hydrated compound to a carboxyl-functional ethylene copolymer and intimately mixing the copolymer and the hydrate under conditions at which the copolymer is in a molten state. The method is suitable with copolymers comprising ethylene and from about 0.01 to about 50 percent by weight of the copolymer of a carboxyl-functional comonomer polymerized therewith. The hydrate used in the method dehydrates at a temperature between about 100° C. and about 300° C., preferably between about 160° C. and about 275° C., and is added in at least an amount sufficient to impart thermal stability upon intimate mixing of the copolymer and the hydrate, up to a rate of about 5 weight percent of the mixture, preferably 0.01-0.45 weight percent, most preferably 0.01-0.15 weight percent.

DETAILED DESCRIPTION OF THE PREFERRED EMBODIMENTS

Ethylene copolymers suitable for use in the invention include copolymers of ethylene and a carboxyl-containing comonomer. By the terms "carboxyl-containing" or "carboxyl-functional" is meant any molecular species containing the moiety:

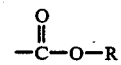

wherein R is hydrogen or metallic cation. The comonomer may compose from about 0.01 to about 50% by weight of the copolymer. The ethylene copolymer may be random, block or graft. Suitable comonomers include olefinically unsaturated carboxylic acids. Exemplary of these are acrylic acid, methacrylic acid, methyl methacrylic acid, ethacrylic acid, crotonic acid, isocrotonic acid, tiglic acid, angelic acid, senecioic acid, and the like. Also suitable are the metal salts of such polymers, or ionomers. The polymers useful in the invention have a melt flow value of from about 0.01 to about 5000. (As used herein, melt flow value has units dg/min and is determined according to ASTM D-1238 condition E.) In addition, the copolymers may contain relatively minor amounts of other polymerizable vinyl monomers such as propylene, butene, hexene, octene, alkyl acrylates, methyl methacrylate, vinyl acetate or the like. Such polymers and the methods for making them, such as described in U.S. Pat. Nos. 3,239,370 and 3,520,861, are well known in the art.

It is essential that the composition contain a hydrate, in intimate admixture with the copolymer, present in at least an amount effective to impart thermal stability thereto up to about 5 weight percent of the composition, preferably 0.01–0.45 weight percent, most preferably 0.01–0.15 weight percent. By the term "thermal stability" is meant that the inherent tendency of the copolymer to crosslink, which is believed to occur primarily through the formation of anhydrides by the carboxyl groups, is inhibited.

Hydrates contemplated for use in the invention include hydrated metallic salts of organic acids, inorganic hydrates, bimetallic hydrates and combinations of any of such hydrates. As used herein, hydrates are defined as the products of the reaction of water with a compound, typically a salt, in which the H-OH bond is not split. It is essential that the hydrates used dehydrate above about 100° C., preferably above 160° C. If the hydrate dehydrates only below this temperature, dehydration of the hydrate may occur before the hydrate is in intimate admixture with the polymer and stabilization will not be complete. It is also essential that the hydrate dehydrate below about 300° C., preferably below about 275° C. If the hydrate does not dehydrate below this temperature, stabilization may not occur. Preferably, the hydrate will dehydrate slightly below or at approximately the temperature at which the copolymer containing the hydrate is to be processed. Typically such processing temperatures of the copolymer vary from about 175° C. for film forming operations to about 230°-260° C. during manufacturing processing of the copolymer and extrusion coating operations.

Specific representative examples of suitable hydrated metallic salts of organic acids include:
Sodium acetate trihydrate;

Sodium boroformate;
Trisodium citrate dihydrate;
Sodium phenolsulfate;
Sodium propionate;
Sodium tartrate dihydrate;
Potassium citrate;
Potassium glutamate;
Potassium tartrate;
Potassium sodium tartrate;
Calcium acrylate hydrate;
Calcium ascorbate;
Calcium D-saccharate;
Calcium tartrate;
Magnesium salicylate;
Magnesium citrate, dibasic; and
Magnesium acetate hydrate.

Of these, sodium tartrate and potassium citrate are preferred, with potassium sodium tartrate being especially preferred.

Specific representative examples of suitable inorganic hydrates include:
Sodium ammonium phosphate tetrahydrate;
Sodium pentaborate;
Sodium phosphite;
Aluminum chloride hydrate;
Aluminum fluoride hydrate;
Aluminum sulfate hydrate;
Zinc sulfate;
Calcium chloride hydrate;
Calcium phosphate, dibasic hydrate;
Calcium phosphate, monobasic;
Lithium tetraborate;
Magnesium phosphate, dibasic dihydrate;
Magnesium phosphate, dibasic trihydrate;
Magnesium sulfate heptahydrate;
Magnesium sulfite;
Magnesium ammonium phosphate;
Magnesium metaborate;
Potassium pyroantimonate; and
Sodium phosphate, tribasic.

Suitable hydrates also include bimetallic hydrates of the formula $$A^a{}_wB^b{}_x(OH)_yC^c{}_z \cdot mH_2O$$

wherein A and B are metallic cations with respective, independent valences a and b of from about 0 to about 10, preferably from about 1 to about 5, most preferably from about 1 to about 3, and having a sum of at least one; C is an anion with a valence c of from about 0 to about 10, preferably from about 1 to about 5, most preferably from about 1 to about 3; w and x independently have a value of from about 1 to about 8; y has a value of from about 0 to about $(aw+bx-1)/a$; z has a value of $(aw+bx-y)/c$; and m has a value of from about 0.1 to about 24, preferably from about 5 to about 15. It is understood that these valences and molecular proportions are averaged quantities, and that such quantities may vary among the individual ions and/or molecules. The following formulae are representative specific examples of such bimetallic hydrates:

$Mg_{4.5}Al_2(OH)_{13}PO_4 \cdot 3.5\ H_2O$;

$Mg_{4.5}Al_2(OH)_{13}CO_3 \cdot 3.5\ H_2O$;

$MgAl_2(OH)_8 \cdot 3\ H_2O$;

$Mg_wAl_x(OH)_{2w+3x} \cdot mH_2O,\ 0 \leq m \leq 3$;

$NaAl_3H_{14}(PO_4)_8 \cdot 4\ H_2O$;

$Na_8Fe_4(P_2O_7)_5 \cdot mH_2O$;

$NaK\ HPO_4 \cdot 7\ H_2O$;

$NaK\ CO_3 \cdot 6\ H_2O$;

$K_2Al_2O_4 \cdot 3\ H_2O$;

$Al_2K_2(SO_4)_4 \cdot 24\ H_2O$; and $Al_2Na_2(SO_4)_4 \cdot 24\ H_2O$.

Such hydrated metallic organic acid salts, inorganic hydrates and bimetallic hydrates and the methods for making them are well known.

It has also been discovered that the thermal stability of the composition is further enhanced when the composition also contains from about 0.01 to about 5, preferably from about 0.01 to about 0.15, percent by weight of the composition of conventional polymer stabilizing additives. Suitable additives include hindered phenolic antioxidants, organic phosphorus compounds, dicarboxylic acids, amine stabilizers, and combinations of any of such stabilizing additives. Representative specific examples of suitable hindered phenolic antioxidants include:
Tetrakis (methylene-3-(3,5-di-t-butyl-4-hydroxyphenyl) propionate) methane;
2,6-Di-t-butyl-p-cresol;
2-t-Butyl-4-hydroxyanisole;
3-t-Butyl-4-hydroxyanisole; and
2,6-Di-t-butyl-4-sec-butylphenol.

Of these, tetrakis (methylene-3-(3,5-di-t-butyl-4-hydroxyphenyl) propionate) methane is especially preferred.

Representative specific examples of suitable organic phosphorus compounds include:
Tris(nonylphenyl) phosphite;
Bis(2,4-di-t-butyl)pentaerythritol diphosphite;
Distearyl pentaerythritol diphosphite; and
Tetrakis(2,4-di-t-butyl phenyl) 4,4'-biphenylylene diphosphonite.

Representative specific examples of suitable dicarboxylic acids include: maleic acid, succinic acid, tartaric acid, adipic acid and anhydrides thereof.

Representative specific examples of suitable amine stabilizers include:
N,N'-Diphenyl-p-phenylenediamine;
N,N'-Di-beta-naphthyl-p-phenylenediamine; and
Polymerized 2,2,4-trimethyl-1,2-dihydroquinoline.

In addition, the composition may contain additional additives such as colorants, pigments, or fillers such as silica, calcium carbonate, metal oxides, talc, clay, sawdust, rice hulls, wood, flour, starch, ground bark and the like. Such inert additives exert no adverse effect upon the capacity of the hydrate to thermally stabilize the composition. When such additional additives are present, they are to be excluded from determinations of the weight percentages of carboxyl-functional copolymer, hydrate and polymer stabilizing additives employed in the composition and method of the invention.

To assure complete thermal stability of the composition, the hydrate and any other polymer stabilizing additives should be in intimate admixture with the copolymer such that the hydrate and polymer stabilizing additives are distributed substantially uniformly throughout the composition. Thus, the hydrate and any polymer stabilizing additive added to the copolymer should be in a readily dispersable form, such as, for example, in a finely divided state or dissolved in a solvent.

In preparing the composition of the invention, the hydrate is first added to the carboxyl-functional copolymer in an amount effective to impart thermal stability thereto upon intimate mixing therewith at a concentration of up to about 5 weight percent of the composition, preferably 0.01–0.45 weight percent, most preferably 0.01–0.15 weight percent. If more than about 5 weight percent is employed, the physical properties of the copolymer may be adversely affected. The hydrate and the copolymer are then intimately mixed under conditions at which the copolymer is in a molten state. The hydrate addition and mixing are performed in the manufacture of the copolymer, or alternatively, may be performed following the manufacture of the copolymer. If desired, the addition and mixing steps may be substantially simultaneous.

When the composition is prepared in the manufacturing process of the carboxyl-functional copolymer, the hydrate may be added to the copolymer at any convenient point downstream of the copolymerization reactor vessel. Typical equipment downstream of the reactor includes separators in which the unreacted monomers and ethylene are removed from the molten polymer, primary extruders, and finishing extruders. Mixing of the hydrate and copolymer is accomplished by the shear imparted to the composition in the processing equipment, such as in lines, valves, pumps, vessels and extruders. The primary advantage of adding the hydrate to the copolymer in the manufacture thereof is that a higher quality product is obtained by an early inhibition of the tendency of the copolymer to crosslink. In addition, the corrosion to process equipment is significantly abated by substantially reducing the formation of corrosive crosslinking by-products.

When the composition is prepared following the manufacture of the carboxyl-functional copolymer, the hydrate addition and mixing may be performed in conventional polymer processing equipment, including compounding extruders, Banbury mixing extruders, intensive mixing or multi-screw extruders, roll mills or the like.

When polymer stabilizing additives are employed, they are added to the carboxyl-functional copolymer in the aforementioned proportions and intimately mixed therewith. The addition of the polymer stabilizing additives may be at the same point and in the same manner as the hydrate addition, or at any other point suitable for the hydrate addition as described above.

The invention is illustrated by way of the following examples.

EXAMPLES

A pelletized ethylene-acrylic acid copolymer prepared by free radical initiation in a stirred autoclave reactor under high pressure was used in preparing the examples. The copolymer contained 6.4 percent acrylic acid by weight as determined according to ASTM D-4094 and had a melt flow value of 7.68 as determined according to ASTM D-1238 condition E. The copolymer was dry blended with 2.0 percent by weight of a hydrate of the formula $Mg_{4.5}Al_2(OH)_{13}PO_4 \cdot 3.5\ H_2O$ and compounded at 177° C. on a 1-inch diameter, 24/1 L/D compounding extruder equipped with metering, compression and mixing sections. During compounding, the dry blended mixture was diluted with additional copolymer to yield a substantially homogeneous composition containing 0.10 percent by weight of the hydrate. The product is referred to herein as Example 1.

An additive-free composition was prepared for comparison purposes by passing the same copolymer through the extruder at duplicated conditions without adding any hydrated compound. This sample is referred to herein as Comparative 1.

Following the same procedure for preparing Example 1, a composition was prepared of the copolymer containing 0.10 percent by weight of a hindered phenolic antioxidant, tetrakis(methylene-3-(3,5-di-t-butyl-4-hydroxyphenyl) propionate) methane. This sample is referred to herein as Comparative 2.

Again following the above procedure, a fourth composition was prepared which contained equal amounts of the hydrate used in Example 1 and the antioxidant used in Comparative 2, with a total additive concentration of 0.10 percent by weight. This sample is referred to herein as Example 2. The composition of the samples are summarized in Table I.

TABLE I

| Example/ | Weight Percent | | |
|---|---|---|---|
| Comparative | EAA[1] | Hydrate[2] | Antioxidant[3] |
| Comp. 1 | 100 | 0 | 0 |
| Comp. 2 | 99.9 | 0 | 0.10 |
| Ex. 1 | 99.9 | 0.10 | 0 |
| Ex. 2 | 99.9 | 0.05 | 0.05 |

Notes:
[1]Ethylene-acrylic acid copolymer, 6.4 wt. % acrylic acid, melt flow value 7.68
[2]$Mg_{4.5}Al_2(OH)_{13}PO_4 \cdot 3.5\ H_2O$
[3]Tetrakis(methylene-3-(3,5-di-t-butyl-4-hydroxy-phenyl)propionate) methane Specimens of Example 1 were placed in a Blue M Electric Co. Model No. E-514A-2 muffle furnace with a dry nitrogen atmosphere at a specified temperature. Separate thermocouples lodged in the specimens recorded the rising temperature thereof up to the specified temperature. At this time ($t_T$) some of the specimens were withdrawn and evaluated for reduction in melt flow values, generally indicating the extent of cross-linking. The remaining specimens were withdrawn and tested after thermally degrading for an additional 5 minutes ($t_5$) or 15 minutes ($t_{15}$) at the specified temperature. The procedure was repeated for various temperatures with Examples 1 and 2 and Comparatives 1 and 2. The results are shown in Table II.

TABLE II

| Temperature | | Percent Loss in Melt Flow Value | | | |
|---|---|---|---|---|---|
| °C. | Time | Comp. 1 | Comp. 2 | Ex. 1 | Ex. 2 |
| — | $t_o$ | 0.0 | 0.0 | 0.0 | 0.0 |
| 240 | $t_T$ | 4.0 | 0.1 | 12.0 | 5.0 |
|  | $t_5$ | 11.5 | 7.4 | 14.3 | 11.9 |
|  | $t_{15}$ | 22.2 | 15.4 | 23.9 | 20.5 |
| 280 | $t_T$ | 21.1 | 23.9 | 16.2 | 19.9 |
|  | $t_5$ | 47.8 | 46.5 | 20.1 | 26.5 |
|  | $t_{15}$ | 67.9 | 57.4 | 34.8 | 35.8 |
| 320 | $t_T$ | 55.9 |  | 23.8 |  |
|  | $t_5$ | 71.0 |  | 29.7 |  |
|  | $t_{15}$ | 68.7 |  | 31.5 |  |

It is observed from the data in Table II that the hydrate demonstrated excellent thermal stabilization of the composition at the higher temperatures, but was not particularly effective in thermally stabilizing the composition at 240° C. It is believed that this variation in effectiveness is because of the relatively high dehydration temperature of the hydrate, ~260° C.

Following the procedures outlined above, additional examples employing various hydrates and polymer stabilizing additives were prepared and evaluated for thermal stability. The results are presented in Tables III, IV and V.

TABLE III

| Example/Comparative[4] | Hydrate | Hydrate Conc. (wt. %) | Stabilizing Additive | Stabilizing Add. Conc. (wt %) |
|---|---|---|---|---|
| Comp. 3 | — | — | — | — |
| Comp. 4 | — | — | PEPQ[5] | 0.10 |
| Comp. 5 | — | — | W-626[6] | 0.10 |
| Ex. 3 | $Mg_{4.5}Al_2(OH)_{13}CO_3 3.5H_2O$ | 0.10 | — | — |
| Ex. 4 | Trisodium phosphate | 0.10 | — | — |
| Ex. 5 | $Mg_{4.5}Al_2(OH)_{13}PO_4 3.5H_2O$ | 0.05 | PEPQ[5] | 0.05 |
| Ex. 6 | $Mg_{4.5}Al_2(OH)_{13}PO_4 3.5H_2O$ | 0.05 | W-626[6] | 0.05 |

[4]Made with ethylene-acrylic acid copolymer, 6.4 wt. % acrylic acid, melt flow value 7.32–8.45.
[5]Tetrakis (2,4-di-t-butyl phenyl) 4,4'-biphenylylene diphosphonite, obtained from Sandoz Laboratories under the trade name SANDOSTAB PEPQ.
[6]Bis (2,4-di-t-butyl) pentaerythritol diphosphite.

TABLE IV

| Temperature °C. | Time | Percent Loss in Melt Flow Value | | | | | | |
|---|---|---|---|---|---|---|---|---|
| | | Comp. 3 | Ex. 3 | Ex. 4 | Comp. 4 | Ex. 5 | Comp. 5 | Ex. 6 |
| — | $t_o$ | 0.0 | 0.0 | 0.0 | 0.0 | 0.0 | 0.0 | 0.0 |
| 240 | $t_T$ | 0.1 | 9.8 | 3.9 | 4.0 | 10.6 | 4.8 | 5.4 |
| | $t_{10}$ | 6.8 | 16.1 | 7.8 | 20.7 | 7.2 | 12.0 | 12.4 |
| | $t_{20}$ | 23.5 | 23.1 | 18.9 | 26.7 | 11.3 | 21.2 | 16.6 |
| 280 | $t_T$ | 6.2 | 11.1 | 14.8 | 21.4 | 4.9 | 12.3 | 7.8 |
| | $t_{10}$ | 39.0 | 17.6 | 23.2 | 43.2 | 15.1 | 22.2 | 23.7 |
| | $t_{20}$ | 51.0 | 28.4 | 27.8 | 38.7 | 18.4 | 39.6 | 34.9 |

TABLE V

| Example/Comp.[7] | Hydrate | Hydrate Conc. (wt. %) | Percent Loss in Melt Flow Value[8] | |
|---|---|---|---|---|
| | | | $t_o$ | $t_{20}$ |
| Comp. 6 | — | — | 0.0 | 50.9 |
| Ex. 7 | Sodium tartrate | 0.05 | 0.0 | 21.2 |
| Ex. 8 | Potassium sodium tartrate | 0.05 | 0.0 | 18.3 |
| Ex. 9 | Potassium sodium tartrate | 0.10 | 0.0 | 13.4 |
| Ex. 10 | Calcium sulfate | 0.05 | 0.0 | 44.8 |
| Ex. 11 | Calcium sulfate | 0.10 | 0.0 | 11.3 |
| Ex. 12 | Calcium chloride | 0.05 | 0.0 | 30.5 |
| Ex. 13 | Calcium chloride | 0.10 | 0.0 | 27.7 |
| Ex. 14 | Potassium citrate | 0.05 | 0.0 | 21.1 |
| Ex. 15 | Potassium citrate | 0.10 | 0.0 | 13.4 |
| Ex. 16 | Calcium phosphate | 0.05 | 0.0 | 34.1 |
| Ex. 17 | Sodium citrate | 0.05 | 0.0 | 17.6 |
| Ex. 18 | Sodium citrate | 0.10 | 0.0 | 19.7 |
| Ex. 19 | $Al_2K_2(SO_4)_4 24H_2O$ | 0.05 | 0.0 | 31.4 |
| Ex. 20 | $Al_2K_2(SO_4)_4 24H_2O$ | 0.10 | 0.0 | 18.7 |
| Ex. 21 | Zinc sulfate | 0.05 | 0.0 | 35.0 |
| Ex. 22 | Zinc sulfate | 0.10 | 0.0 | 29.6 |
| Ex. 23 | Magnesium acetate | 0.10 | 0.0 | 46.2 |

Notes:
[7]Made with ethylene-acrylic acid copolymer, 6.4 wt. % acrylic acid, melt flow value 7.33–9.09.
[8]At 280° C.

The data presented above demonstrates the thermal stability of the composition of the invention containing 1000 ppm hydrate or 500 ppm hydrate and 500 ppm antioxidant in contrast to heretofore known compositions containing no additives or only conventional antioxidants.

Having described our invention above, many variations in the materials, ratios and method of preparation, as well as in the illustrated details of the composition and method will occur to those skilled in the art. It is intended that all such variations which fall within the scope of the appended claims be embraced thereby.

We claim:

1. A carboxyl-containing ethylene copolymer composition having improved resistance to melt flow value reduction at molten conditions, consisting essentially of:
    (a) a copolymer ethylene and from about 0.01 to about 50 percent by weight of said copolymer of a carboxyl-functional comonomer copolymerized therewith; and
    (b) a hydrated compound in intimate admixture with said copolymer, said hydrate dehydrating at a temperature between about 100° C. and about 300° C., said hydrate present in an amount of from about 0.01 to about 0.45 percent by weight of said composition.

2. The composition of claim 1, wherein said comonomer is selected from the group consisting of: acrylic acid, methacrylic acid, methyl methacrylic acid, ethacrylic acid, crontonic acid, isocrotonic acid, tiglic acid, angelic acid, seneciotic acid, ionomers thereof, and combinations thereof.

3. The composition of claim 1, wherein said hydrate is selected from the group consisting of: hydrated metallic salts of organic acids, inorganic hydrates, bimetallic hydrates, and combinations thereof.

4. The composition of claim 1, wherein said hydrate is selected from the group consisting of:
Sodium acetate trihydrate;
Sodium boroformate;
Trisodium citrate dihydrate;
Sodium phenolsulfate;
Sodium propionate;
Sodium tartrate dihydrate;
Potassium citrate;
Potassium glutamate;
Potassium tartrate;
Potassium sodium tartrate;
Calcium acrylate hydrate;
Calcium ascorbate;
Calcium D-saccharate;
Calcium tartrate;
Magnesium salicylate;
Magnesium citrate, dibasic;
Magnesium acetate hydrate; and combinations thereof.

5. The composition of claim 1, wherein said hydrate is potassium sodium tartrate.

6. The composition of claim 1, wherein said hydrate is selected from the group consisting of:
Sodium ammonium phosphate tetrahydrate;
Sodium pentaborate;
Sodium phosphite;
Aluminum chloride hydrate;
Aluminum fluoride hydrate;
Aluminum sulfate hydrate;
Zinc sulfate;
Calcium chloride hydrate;
Calcium phosphate, dibasic hydrate;
Calcium phosphate, monobasic;
Lithium tetraborate;
Magnesium phosphate, dibasic dihydrate;
Magnesium phosphate, dibasic trihydrate;
Magnesium sulfate heptahydrate;

Magnesium sulfite;
Magnesium ammonium phosphate;
Magnesium metaborate;
Potassium pyroantimonate;
Sodium phosphate, tribasic; and combinations thereof.

7. The composition of claim 1, wherein said hydrate is of the formula $A^a{}_wB^b{}_x(OH)_yC^c{}_z\cdot mH_2O$ wherein A and B are metallic cations with respective, independent valences a and b of from about 0 to about 10 with a sum of at least one, C is an anion with a valence c of from about 0 to about 10, w and x independently have a value of from about 1 to about 8, y has a value of from about 0 to about $(aw+bx-1)/a$, z has a value of $(aw+bx-y)/c$, and m has a value of from about 0.1 to about 24.

8. The composition of claim 7, wherein said valences a, b and c are independently 1–5.

9. The composition of claim 7, wherein said valences a, b and c are independently 1–3.

10. The composition of claim 7, wherein said hydrate is selected from the group consisting of:
Mg$_{4.5}$Al$_2$(OH)$_{13}$PO$_4\cdot$3.5 H$_2$O;
Mg$_{4.5}$Al$_2$(OH)$_{13}$CO$_3\cdot$3.5 H$_2$O;
MgAl$_2$(OH)$_8\cdot$3 H$_2$O;
Mg$_w$Al$_x$(OH)$_{2w+3x}\cdot$mH$_2$O, $0 \leq m \leq 3$;
NaAl$_3$H$_{14}$(PO$_4$)$_8\cdot$4 H$_2$O;
Na$_8$Fe$_4$(P$_2$O$_7$)$_5\cdot$mH$_2$O;
NaK HPO$_4\cdot$7 H$_2$O;
NaK CO$_3\cdot$6 H$_2$O;
K$_2$Al$_2$O$_4\cdot$3 H$_2$O;
Al$_2$K$_2$(SO$_4$)$_4\cdot$24 H$_2$O;
Al$_2$Na$_2$(SO$_4$)$_4\cdot$24 H$_2$O; and combinations thereof.

11. The composition of claim 1, wherein said hydrate is present in an amount of from about 0.01 to about 0.15 percent by weight.

12. The composition of claim 1, wherein said hydrate dehydrates between about 160° C. and about 275° C.

13. A carboxyl-containing ethylene copolymer composition having improved resistance to melt flow value reduction at molten conditions, consisting essentially of:
(a) a copolymer comprising ethylene and from about 0.01 to about 50 percent by weight of said copolymer of a carboxyl-functional comonomer copolymerized therewith;
(b) a hydrated compound in intimate admixture with said copolymer, said hydrate dehydrating at a temperature between about 100° C. and about 300° C., said hydrate present in an amount of from about 0.01 to about 0.45 percent by weight of said composition; and
(c) from about 0.01 to about 5 percent by weight of said composition of a polymer stabilizing additive selected from the group consisting of: hindered phenolic antioxidants, organic phosphorus compounds, dicarboxylic acids, amine stabilizers, and combinations thereof.

14. The composition of claim 13, wherein said composition contains 0.01–0.15 percent by weight of said polymer stabilizing additive.

15. The composition of claim 13, wherein said additive is selected from the group consisting of:
Tetrakis (methylene-3-(3,5-di-t-butyl-4-hydroxyphenyl) propionate) methane;
2,6-Di-t-butyl-p-cresol;
2-t-Butyl-4-hydroxyanisole;
3-t-Butyl-4-hydroxyanisole;
2,6-Di-t-butyl-4-sec-butlphenol; and combinations thereof.

16. The composition of claim 13, wherein said additive is selected from the group consisting of:
Tris(nonylphenyl) phosphite;
Bis(2,4-di-t-butyl)pentaerythritol diphosphite;
Distearyl pentaerythritol diphosphite;
Tetrakis(2,4-di-t-butyl phenyl) 4,4'-biphenylylene diphosphonite; and combinations thereof.

17. The composition of claim 13, wherein said additive is selected from the group consisting of: maleic acid, succinic acid, tartaric acid, adipic acid, anhydrides thereof, and combinations thereof.

18. The composition of claim 13, wherein said additive is selected from the group consisting of:
N,N'-Diphenyl-p-phenylenediamine;
N,N'-Di-beta-naphthyl-p-phenylenediamine;
polymerized 2,2,4-trimethyl-1,2-dihydroquinoline; and combinations thereof.

19. A method for improving the resistance of carboxyl-containing ethylene copolymers to melt flow value reduction at molten conditions, comprising the steps of:
(a) essentially adding hydrated compound which dehydrates at a temperature between about 100° C. and about 300° C. to a copolymer comprising ethylene and from about 0.01 to about 50 weight percent of said copolymer of a carboxyl-functional comonomer copolymerized therewith, said addition of said hydrate at a concentration of from about 0.01 to about 0.45 weight percent of said mixture; and
(b) intimately mixing said copolymer and said hydrate under conditions at which said copolymer is in a molten state to produce a carboxyl-containing ethylene copolymer resistant to reduction in melt flow value.

20. The method of claim 19, wherein said comonomer is selected from the group consisting of: acrylic acid, methacrylic acid, methyl methacrylic acid, ethacrylic acid, crotonic acid, isocrotonic acid, tiglic acid, angelic acid, senecioic acid, ionomers thereof, and combinations thereof.

21. The method of claim 19, wherein said hydrate is selected from the group consisting of: hydrated metallic salts of organic acids, inorganic hydrates, bimetallic hydrates, and combinations thereof.

22. The method of claim 19, wherein said hydrate is selected from the group consisting of:
Sodium acetate trihydrate;
Sodium boroformate;
Trisodium citrate dihydrate;
Sodium phenolsulfate;
Sodium propionate;
Sodium tartrate dihydrate;
Potassium citrate;
Potassium glutamate;
Potassium tartrate;
Potassium sodium tartrate;
Calcium acrylate hydrate;
Calcium ascorbate;
Calcium D-saccharate;
Calcium tartrate;
Magnesium salicylate;
Magnesium citrate, dibasic;
Magnesium acetate hydrate; and combinations thereof.

23. The method of claim 19, wherein said hydrate is potassium sodium tartrate.

24. The method of claim 19, wherein said hydrate is selected from the group consisting of:
Sodium ammonium phosphate tetrahydrate;
Sodium pentaborate;
Sodium phosphite;
Aluminum chloride hydrate;
Aluminum fluoride hydrate;
Aluminum sulfate hydrate;
Zinc sulfate;
Calcium chloride hydrate;
Calcium phosphate, dibasic hydrate;
Calcium phosphate, monobasic;
Lithium tetraborate;
Magnesium phosphate, dibasic dihydrate;
Magnesium phosphate, dibasic trihydrate;
Magnesium sulfate heptahydrate;
Magnesium sulfite;
Magnesium ammonium phosphate;
Magnesium metaborate;
Potassium pyroantimonate;
Sodium phosphate, tribasic; and combinations thereof.

25. The method of claim 19, wherein said hydrate is a bimetallic hydrate of the formula $A^a{}_wB^b{}_x(OH)_yC^c{}_z \cdot mH_2O$ wherein A and B are metallic cations with respective, independent valences a and b of from about 0 to about 10 with a sum of at least one, C is an anion with a valence c of from about 0 to about 10, w and x independently have a value of from about 1 to about 8, y has a value of from about 0 to about $(aw+bx-1)/a$, z has a value of $(aw+bx-y)/c$, and m has a value of from about 0.1 to about 24.

26. The method of claim 25, wherein said valences a, b and c are independently 1–5.

27. The method of claim 25, wherein said valences a, b and c are independently 1–3.

28. The method of claim 25, wherein said hydrate is selected from the group consisting of:
$Mg_{4.5}Al_2(OH)_{13}PO_4 \cdot 3.5\ H_2O$;
$Mg_{4.5}Al_2(OH)_{13}CO_3 \cdot 3.5\ H_2O$;
$MgAl_2(OH)_8 \cdot 3\ H_2O$;
$Mg_wAl_x(OH)_{2w+3x} \cdot mH_2O$, $0 \leq m \leq 3$;
$NaAl_3H_{14}(PO_4)_8 \cdot 4H_2O$;
$Na_8Fe_4(P_2O_7)_5 \cdot mH_2O$;
$NaK\ HPO_4 \cdot 7\ H_2O$;
$NaK\ CO_3 \cdot 6\ H_2O$;
$K_2Al_2O_4 \cdot 3\ H_2O$;
$Al_2K_2(SO_4)_4 \cdot 24\ H_2O$;
$Al_2Na_2(SO_4)_4 \cdot 24\ H_2O$; and combinations thereof.

29. The method of claim 19, wherein said addition of said hydrate is at a concentration of from about 0.01 to about 0.15 weight percent of said mixture.

30. The method of claim 19, wherein said hydrate dehydrates between about 160° C. and about 275° C.

31. A method for improving the resistance of carboxyl-containing ethylene copolymers to melt flow value reduction at molten conditions, comprising the steps of:
(a) essentially adding hydrated compound which dehydrates at a temperature between about 100° C. and about 300° C. to a copolymer comprising ethylene and from about 0.01 to about 50 weight percent of said copolymer of a carboxyl-functional comonomer copolymerized therewith, said addition of said hydrate at a concentration of from about 0.01 to about 0.45 weight percent of said mixture;
(b) intimately mixing said copolymer and said hydrate under conditions at which said copolymer is in a molten state to produce a carboxyl-containing ethylene copolymer resistant to reduction in melt flow value;
(c) adding to said copolymer from about 0.01 to about 5 percent by weight of said mixture of a polymer stabilizing additive selected from the group consisting of: hindered phenolic antioxidants, organic phosphorus compounds, dicarboxylic acids, amine stabilizers, and combinations thereof; and
(d) intimately mixing said copolymer with said stabilizing additive.

32. The method of claim 31, wherein said addition of said polymer stabilizing additive is at a concentration of 0.01–0.15 percent by weight of said mixture.

33. The method of claim 31, wherein said additive is selected from the group consisting of:
Tetrakis (methylene-3-(3,5-di-t-butyl-4-hydroxyphenyl) propionate) methane;
2,6-Di-t-butyl-p-cresol;
2-t-Butyl-4-hydroxyanisole;
3-t-Butyl-4-hydroxyanisole;
2,6-Di-t-butyl-4-sec-butylphenol; and combinations thereof.

34. The method of claim 31, wherein said additive is selected from the group consisting of:
Tris(nonylphenyl) phosphite;
Bis(2,4-di-t-butyl)pentaerythritol diphosphite;
Distearyl pentaerythritol diphosphite;
Tetrakis(2,4-di-t-butyl phenyl) 4,4'-biphenylylene diphosphonite; and combinations thereof.

35. The method of claim 31, wherein said additive is selected from the group consisting of: maleic acid, succinic acid, tartaric acid, adipic acid, anhydrides thereof, and combinations thereof.

36. The method of claim 31, wherein said additive is selected from the group consisting of:
N,N'-Diphenyl-p-phenylenediamine;
N,N'-Di-beta-naphthyl-p-phenylenediamine;
polymerized 2,2,4-trimethyl-1,2-dihydroquinoline; and combinations thereof.

37. The method of claim 31, wherein said addition steps and said mixing steps are performed during the manufacture of said copolymer.

38. The method of claim 37, wherein said addition steps are performed at a point downstream of the copolymerization reactor, said point selected from the group consisting of: separators, primary extruders, finishing extruders, and combinations thereof.

39. The method of claim 31, wherein said addition steps and said mixing steps are performed following the manufacture of said copolymer.

40. The method of claim 39, wherein said mixing steps are performed on a mixer selected from the group consisting of: compounding extruders, Banbury mixing extruders, intensive mixing extruders, roll mills, or combinations thereof.

* * * * *

UNITED STATES PATENT AND TRADEMARK OFFICE
CERTIFICATE OF CORRECTION

PATENT NO. : 4,594,382

DATED : June 10, 1986

INVENTOR(S) : Stephen M. Hoenig, David P. Flores and Gregory S. O'Connell

It is certified that error appears in the above-identified patent and that said Letters Patent is hereby corrected as shown below:

Col. 8, line 11; insert --comprising-- between "copolymer" and "ethylene".

Col. 8, line 24; "crontonic" should read --crotonic--.

Col. 8, line 25; "seneciotic" should read --senecioic--.

Col. 9, line 67; "2,6-Di-t-butyl-4-sec-butlphenol" should read --2,6-Di-t-butyl-4-sec-butylphenol--.

Signed and Sealed this

Fourteenth Day of April, 1987

Attest:

DONALD J. QUIGG

Attesting Officer

Commissioner of Patents and Trademarks